US011680182B2

(12) United States Patent
Agirman et al.

(10) Patent No.: US 11,680,182 B2
(45) Date of Patent: Jun. 20, 2023

(54) COMPOSITION FOR COATING TEXTILE ARTICLES AND TEXTILE ARTICLES COMPRISING IT

(71) Applicant: Sanko Tekstil Isletmeleri San. Ve Tic. A.S., Inegol-Bursa (TR)

(72) Inventors: Ali Kemal Agirman, Inegol-Bursa (TR); Gokhan Kaplan, Inegol-Bursa (TR); Fatma Korkmaz, Inegol-Bursa (TR); Seref Agzikara, Inegol-Bursa (TR); Ozgur Cobanoglu, Inegol-Bursa (TR); Jitka Eryilmaz, Inegol-Bursa (TR); Deniz Iyidogan, Inegol-Bursa (TR); Leyla Zengi, Inegol-Bursa (TR); Sabrettin Akbulut, Inegol-Bursa (TR); Semih Kazanc, Inegol-Bursa (TR)

(73) Assignee: Sanko Tekstil Isletmeleri San. Ve Tic. A.S., Inegol-Bursa (TR)

( * ) Notice: Subject to any disclaimer, the term of this patent is extended or adjusted under 35 U.S.C. 154(b) by 722 days.

(21) Appl. No.: 16/575,621

(22) Filed: Sep. 19, 2019

(65) Prior Publication Data
US 2020/0095451 A1  Mar. 26, 2020

(30) Foreign Application Priority Data

Sep. 19, 2018  (EP) .................................... 18195352

(51) Int. Cl.
| | | |
|---|---|---|
| *C09D 131/04* | (2006.01) | |
| *C08K 5/00* | (2006.01) | |
| *C08K 5/10* | (2006.01) | |
| *C08K 5/19* | (2006.01) | |
| *C08K 5/521* | (2006.01) | |
| *C08K 7/14* | (2006.01) | |
| *C09D 17/00* | (2006.01) | |
| *C09D 125/08* | (2006.01) | |
| *C09D 127/16* | (2006.01) | |
| *C09D 133/08* | (2006.01) | |
| *C09D 183/04* | (2006.01) | |
| *D06M 15/233* | (2006.01) | |
| *D06M 15/256* | (2006.01) | |
| *D06M 15/263* | (2006.01) | |
| *D06M 15/333* | (2006.01) | |

(52) U.S. Cl.
CPC .......... *C09D 131/04* (2013.01); *C08K 5/0041* (2013.01); *C08K 5/10* (2013.01); *C08K 5/19* (2013.01); *C08K 5/521* (2013.01); *C08K 7/14* (2013.01); *C09D 17/001* (2013.01); *C09D 125/08* (2013.01); *C09D 127/16* (2013.01); *C09D 133/08* (2013.01); *C09D 183/04* (2013.01); *D06M 15/233* (2013.01); *D06M 15/256* (2013.01); *D06M 15/263* (2013.01); *D06M 15/333* (2013.01); *D06M 2200/35* (2013.01)

(58) Field of Classification Search
None
See application file for complete search history.

(56) References Cited

U.S. PATENT DOCUMENTS

| | | | | |
|---|---|---|---|---|
| 4,082,887 A | * | 4/1978 | Coates | ................... A23B 7/148 524/229 |
| 4,382,990 A | * | 5/1983 | Coates | ................ D06M 15/256 442/84 |
| 4,510,282 A | | 4/1985 | Goll | |
| 2019/0125028 A1 | * | 5/2019 | Bartel | .................. A43B 1/0027 |

FOREIGN PATENT DOCUMENTS

| | | |
|---|---|---|
| CN | 103 668 988 | 3/2014 |
| CN | 106 087 445 | 11/2016 |
| CN | 107 188 011 | 8/2017 |
| CN | 107100011 A * | 8/2017 |
| CN | 108 547 156 | 9/2018 |
| DE | 197 38 625 | 2/1999 |
| WO | 01/00739 | 1/2001 |
| WO | 2017/197220 | 11/2017 |
| WO | 2018/114523 | 6/2018 |

OTHER PUBLICATIONS

IPS Product Information Sheet for PVDF, Aug. 4, 2016 (Year: 2016).*
Machine Translation of CN107100011A, Zhu et al. Aug. 2017 (Year: 2017).*
International Search report and written opinion issued by the EPO for PCT/EP2019/075251 dated Nov. 26, 2019.
European Search report issued by the EPO for priority EP application No. 18195352.2 dated Mar. 25, 2019.

* cited by examiner

Primary Examiner — Robert T Butcher
(74) Attorney, Agent, or Firm — Silvia Salvadori

(57) ABSTRACT

The present invention relates to an aqueous paste composition for textile coating, comprising: 1-60 parts by weight of at least one material having tensile modulus of at least 2000 MPa, 1-24 parts by weight of at least one antistatic agent, 16-60 parts by weight of at least one binder, and 50-200 parts by weight of water. The invention also relates to a process for producing a coated fabric, to a coated fabric as obtainable trough said process, and to a garment comprising it.

22 Claims, No Drawings

COMPOSITION FOR COATING TEXTILE ARTICLES AND TEXTILE ARTICLES COMPRISING IT

This non-provisional application claims priority to and the benefit of European Application No. EP18195352.2 filed on 19 Sep. 2018, the content of which is incorporated herein by reference in its entirety.

FIELD OF THE INVENTION

The present invention relates to the field of textiles, in particular to compositions that are suitable to impart impact abrasion resistance to textiles which are applied to.

The present invention also relates to fabrics coated with such compositions, and to garments comprising such coated fabrics.

BACKGROUND OF THE INVENTION

The use of appropriate gears and equipment is essential to safely ride motorcycles and similar vehicles.

However, motorcycle gears are generally not suitable for daily use.

Textiles, e.g., fabrics, comprising high strength performance yarns (such as, for example, Dyneema®, Spectra®, Kevlar®, etc.) are known in the production of garments and clothing that are suitable to be used as motorcycle gears.

Such textiles can be monolayer or multilayer fabrics which are produced, as above mentioned, by using high strength performance yarns. For example, high strength performance yarns interlaced with monolayer textile weaves (plain, twill etc.) or multilayer textile weaves (by layer to layer binding, angle locking, binder etc.) are known in the art.

However, known textiles generally do not have aesthetical characteristics which make the fabric or garment fashionable in the clothing industry, as well as suitable for daily use.

There are also several chemicals that are known to impart abrasion resistance and impact resistance properties to substrates which they are applied to.

U.S. Pat. No. 4,510,282 discloses an aqueous dispersion for the production of corrosion- and weather-resistant coatings on work materials, especially on synthetic fiber fabrics. The aqueous dispersion disclosed in U.S. Pat. No. 4,510,282 comprises polyvinylidene fluoride (PVDF), water, an acrylic co-polymer, a pigment, a UV-light protection agent and a solvent (e.g., a low boiling alcohol). U.S. Pat. No. 4,510,282 discloses that the aqueous dispersion can be used for the production of corrosion- and weather-resistant coatings on heavy duty fabrics to be used to make inflatable hangars, tent roofs and conveying belts.

However, textile articles, suitable for the production of garments and motorcycle gears, that are resistant to impact abrasion as well as soft and stylish, cannot be obtained by using the currently known compositions.

SUMMARY OF THE INVENTION

It is an aim of the present invention to solve the above mentioned problems and to provide a composition suitable to be applied to textile articles, such as fabrics or garments.

Another aim of the present invention is to provide a composition that can impart impact abrasion resistance to textile articles.

Still another aim of the present invention is to provide a composition that is suitable to be used in the production of fabrics and garments that are suitable for daily use.

A further aim of the present invention is to provide a textile article which is suitable for use in both motorcycle gears and daily use garments.

These and other aims are achieved by the aqueous paste composition according to claim 1.

It is thus an object of the present invention an aqueous paste composition for textile coating, comprising:
- 1-60 parts by weight of at least one material having tensile modulus of at least 2000 MPa,
- 1-24 parts by weight of at least one antistatic agent,
- 16-60 parts by weight of at least one binder,
- 50-200 parts by weight of water.

A further object of the present invention is a process according to claim 13, namely, a process for producing a coated fabric, comprising the step of:
a) providing at least a fabric,
b) coating at least part of the fabric with an aqueous paste composition according to the invention, and
c) drying the fabric obtained in step b) to fix the coating to the fabric.

Still further objects of the present invention are a coated fabric according to claim 18 and a garment comprising the coated fabric, according to claim 23.

Preferred aspects of the invention are recited in dependent claims.

DETAILED DESCRIPTION

In the following description, the features of the invention will be described with reference to exemplary embodiments; however, any feature of the invention disclosed herein, may be combined with one or more other features here disclosed to provide further embodiments of the present invention. Such embodiments shall be considered as disclosed by the present application.

As above mentioned, an object of the present invention is an aqueous paste composition for textile coating, comprising:
- 1-60 parts by weight of at least one material having tensile modulus of at least 2000 MPa,
- 1-24 parts by weight of at least one antistatic agent,
- 16-60 parts by weight of at least one binder, and
- 50-200 parts by weight of water.

Advantageously, the aqueous paste composition of the invention allows for the production of textiles that are suitable to be used in the production of garments and motorcycle gears such as, for example, pants and jackets. In fact, it has been surprisingly observed that the aqueous paste composition of the invention imparts impact abrasion resistance properties to the textiles that have been treated with the composition, whilst maintaining the textiles soft and stylish.

According to embodiments, the composition comprises particles and/or short fibers obtained from at least one material having tensile modulus of at least 2000 MPa. In other words, according to embodiments, the material having tensile modulus of at least 2000 MPa in the composition may be in the form of particles and/or short fibers.

According to embodiments, particles and short fibers may have size in the range of, for example, from 0.1 µm to 10 µm, preferably from 0.5 µm to 5 µm, more preferably from 1 µm to 4 µm.

According to embodiments, the composition may contain 1-40 parts by weight, preferably 20-40 parts by weight of at least one material having tensile modulus of at least 2000 MPa.

According to embodiments, the material having tensile modulus of at least 2000 MPa is in powder form. In other words, according to embodiments, the composition comprises a powder obtained from at least one material having tensile modulus of at least 2000 MPa.

According to embodiments, the material having tensile modulus of at least 2000 MPa may be selected from fluoropolymers, glass fibers and mixture thereof.

According to embodiments, one or more fluoropolymers may be selected from the group consisting of polyvinylidene fluoride (PVDF), polytetrafluoroethylene (PTFE), perfluoroalkoxy alkanes (PFA), fluorinated ethylene propylene (FEP), perfluoro elastomers (e.g. the commercial product Chemraz®), and mixtures thereof.

For example, polyvinylidene fluoride (PVDF) suitable to be used in the present invention is the commercial product Kynar® 761A.

Preferably, the material having tensile modulus of at least 2000 MPa is selected from the group consisting of polyvinylidene fluoride (PVDF), glass fiber and a mixture thereof.

The tensile modulus may be measured according to known methods. For example, tensile modulus of plastics, such as PVDF, may be measured according to International Standards ISO 527-1 and ISO 527-2, while the tensile modulus of glass fiber may be measured, for example, according to ASTM C1557-14.

According to embodiments, the at least one material having tensile modulus of at least 2000 MPa in the composition of the invention may be a fluoropolymer, preferably polyvinylidene fluoride (PVDF); in this case, the tensile modulus may be measured according to ISO 527-1 and ISO 527-2.

According to embodiments, the at least one material having tensile modulus of at least 2000 MPa in the composition of the invention may be glass fiber; in this case, the tensile modulus being measured according to ASTM C1557-14. According to embodiments, the composition of the invention may contain 5-24 parts by weight, preferably 5-20 parts by weight of the at least one antistatic agent.

As used herein, the term "antistatic agent" refers to a compound that is suitable to be included into a mixture, such as an aqueous paste composition, in order to reduce or eliminate buildup of static electricity when the mixture is applied to a substrate, e.g. a textile.

According to embodiments, the antistatic agent may be selected from the group consisting of esters of phosphoric acid, polyethylene glycol esters, polyols, quaternary ammonium compounds, polysiloxane, polyol amine, polyvinyl chloride derivatives, heterocyclic additives, and mixture thereof.

For example, suitable heterocyclic additives are imidazolinium, pyridinium, piperidinium and morpholinium salts, and mixtures thereof.

According to embodiments, the composition of the invention may contain 16-50 parts by weight, preferably 20-50 parts by weight of the at least one binder. A used herein, the term "binder" refers to a compound that is used to bind together two or more other materials in a mixture, such as an aqueous paste composition, and contributes to the adhesion of the mixture to a substrate when the mixture is applied to said substrate, e.g., to a textile.

According to embodiments, the binder is a matrix-forming binder, e.g., a film-forming binder.

Preferably, the binder is a polymeric binder.

According to embodiments, the binder is selected from the group consisting of vinyl acetate, acrylic, styrene/acrylic, vinyl/verstate, vinyl/acrylic copolymers and mixtures thereof.

The composition of the invention may further comprise at least one wetting agent.

Preferably, said at least one wetting agent may be selected from the group consisting of anionic, cationic, nonionic, amphoteric wetting agents, and mixtures thereof.

Advantageously, when the composition comprises at least one wetting agent, the composition of the invention can be applied to a textile in a particularly easy way.

In embodiments, the composition of the invention includes at least one wetting agent in an amount of 0.1-10 parts by weight, preferably 1-10 parts by weight. According to embodiments, the aqueous paste composition of the invention may further comprise at least one antifoam agent. Preferably, the antifoam agent is in liquid form.

Advantageously, when the composition comprises at least one antifoam agent, the composition of the invention can be prepared and manipulated, e.g., during its preparation and/or during the application to a textile (e.g., a fabric) substantially reducing or substantially avoiding the formation of foam.

According to embodiments, when the composition contains at least one antifoam agent, the antifoam agent is preferably in an amount in the range of from 0.1 to 5 parts by weight, more preferably in an amount in the range of from 1 to 4 parts by weight.

According to embodiments, the antifoam agent is selected from the group consisting of alkyl poly acrylates, castor oil, fatty acids, fatty acids esters, fatty acids sulfate, fatty alcohol, fatty alcohol esters, fatty alcohol sulfate, foot olive oil, mono and di glyceride, paraffin oil, paraffin wax, poly propylene glycol, silicones oil, vegetable and animal fats, vegetable and animal fats sulfates, vegetable and animal oils, vegetable and animal oil sulfates, vegetable and animal wax, vegetable and animal wax sulfate.

According to embodiments, the composition of the present invention may comprise:
  7.5%-15% by weight of at least one material having tensile modulus of at least 2000 MPa;
  1.5%-2.5% by weight of at least one antistatic agent;
  20%-30% by weight of at least one binder;
  60%-70% by weight of water, and
  optionally, 2%-3% of at least one wetting agent;
  optionally, 0.1%-0.3% of at least one antifoam agent.

Amounts of the different components of the composition are advantageously selected in order to obtain 100% by weight, i.e. the final weight of the composition.

For example, embodiments of the composition having final weight 1000 g, may comprise:
  75 g-150 g of at least one material having tensile modulus of at least 2000 MPa;
  15 g-25 g of at least one antistatic agent;
  200 g-300 g of at least one binder;
  600 g-700 g of water, and
  optionally, 20 g-30 g of at least one wetting agent;
  optionally, 1 g-3 g of at least one antifoam agent.

According to embodiments, the composition of the invention may include one or more thickeners.

Thickeners that are suitable to be included in aqueous paste coating compositions for fabrics are known in the art, and are commercially available; suitable thickeners are natural and synthetic thickeners such as e.g. alginates, guars and acrylic polymers and copolymers.

Advantageously, one or more thickeners may be included into the composition of the invention in order to adjust the viscosity of the coating paste composition. Preferably, the viscosity of the coating paste composition of the invention is between 15-30 dPas, preferably between 20-25 dPas, measured with HAAKE Viscotester® 2 plus. The HAAKE Viscotester® 2 plus is a rotational viscometer.

According to embodiments, the composition of the invention is substantially colourless. In this case, advantageously, when the the composition is applied to a fabric or a garment, the coating does not substantially affect the colour of the fabric or garment which is applied to. For example, if the fabric coated with the composition is an indigo dyed fabric, the coating would not substantially affect the visual aestetical appearance of the indigo dyed fabric.

According to embodiments, the aqueous paste composition of the invention may contain a dyestuff, for example indigo. In this case, when the aqueous paste composition, containing one or more dyestuff, is applied to a fabric or a garment, advantageously, it allows to provide the fabric or garment with impact abrasion resistance as well as with visual aesthetical effects. In this case, advantageously, motorcycle gears having a particularly fashionable appearance may be obtained.

According to embodiments, the composition of the invention may include one or more dyestuffs in an amount in the range of from 10 to 50 g/l (i.e., from 10 to 50 grams of dyestuff per liter of composition), preferably from 25 to 35 g/l. For example, the aqueous paste composition may include 30 g/l of indigo.

The composition of the invention may be produced through known methods. For example, it may be produced by mixing the different components.

According to embodiments, the components may be provided and admixed together to obtain the composition of the invention.

According to embodiments, two or more components may be provided sequentially during the mixing.

For example, the process for producing the composition of the invention may comprise the following steps:
- providing 50-200 parts by weight of water; optionally adding 0.1-10 parts by weight of a wetting agent and mixing to obtain an homogeneous mixture;
- Adding 1-60 parts by weight of at least one material having tensile modulus of at least 2000 MPa (e.g., polyvinylidene fluoride (PDVF)) and mixing to obtain an homogeneous mixture;
- Adding 16-60 parts by weight of a binder, 1-24 parts by weight of an antistatic agent, and optionally 0.1 to 4 parts by weight of an antifoam agent, to the mixture and mixing to obtain an homogeneous mixture;
- Optionally adding a thickener in an amount suitable to obtain a composition having a suitable viscosity and mixing to obtain an homogeneous mixture.

The aqueous paste composition of the invention may be applied to a fabric through known coating methods, such as knife coating.

Knife coating is a method that is known in the art.

Preferably, the aqueous paste composition is applied to a fabric in an amount in the range of at least 1 g per square meter of fabric, preferably from 35 g to 100 g per square meter of fabric, more preferably from 50 g to 75 g per square meter of fabric, even more preferably from 55 g to 70 g per square meter of fabric.

Preferably, the composition is applied to a fabric in an amount suitable to obtain on the fabric an amount of dry coating which is in the range of at least 1 g per square meter of fabric, preferably from 10 g to 40 g per square meter of fabric, more preferably from 20 g to 30 g per square meter of fabric, even more preferably from 22 g to 28 g per square meter of fabric.

Advantageously, by varying the amount of paste composition applied to the fabric, the final thickness of the coating on the fabric may be varied.

In the present description, when reference is made to a fabric, this reference includes the fabric present in an article, especially a garment or clothing article, in particular articles that are suitable for production of motorcycle gears, such as, for example, pants and jackets.

According to embodiments of the invention, the fabric is preferably a woven fabric, and more preferably is a denim fabric.

For example, the fabric may be a double warp woven fabric or a standard woven fabric, such as a plain fabric, a twill fabric or a satin fabric.

According to embodiments, the woven fabric may be selected from double warp woven fabric and denim fabric.

According to embodiments, the fabric has a weight that is lower than 750 g/m$^2$, preferably lower than 600 g/m$^2$, more preferably lower that 550 g/m$^2$.

According to embodiments, woven fabrics suitable to be used in the present invention have warp density in the range of from 10 to 150 ends/cm, preferably from 40 to 60 ends/cm.

According to embodiments, woven fabrics suitable to be used in the present invention have weft density in the range of from 5 to 50 ends/cm, preferably from 10 to 30 ends/cm.

Advantageously, woven fabrics suitable to be used in the present invention may have any combination of the warp density and weft density values, as above mentioned.

According to embodiments, the fabric may include natural yarns and/or synthetic yarn and/or mixed yarns. Additionally or alternatively, in embodiments, the fabric may include high strength performance yarns and/or fibers preferably selected from the group consisting of Kevlar®, Dyneema®, Spectra®, Aramid, Ultra high molecular weight polyethylene, polybenzoxazole, polyarylate, carbon, polyolefin, and mixture thereof; more preferably selected from the group consisting of Kevlar®, Dyneema®, Spectra®, and mixture thereof.

According to embodiments, the fabric may include one or more high strength performance yarns as well as one or more natural yarns and/or one or more synthetic yarns and/or one or more mixed yarns.

According to embodiments, the fabric includes at least 1% by weight, preferably at least 10%, more preferably at least 25% by weight, even more preferably at least 50% by weight of high strength performance yarns and/or fibers.

In the present description, natural yarns are yarns that include natural fibers, which may be selected from cotton, wool, flax, kenaf, ramie, hemp, linen and mixtures thereof.

In the present description, synthetic yarns are yarns that include synthetic fibers, which may be selected from polyester, rayon, nylon, lycra, elastane and mixtures thereof.

In the present description, mixed yarns are yarns that include both natural (e.g., cotton) and synthetic fibers.

According to embodiments, the fabric may include natural fibers, and/or synthetic fibers and/or high strength fibers.

For example, the fabric may include cotton fibers, elastane fibers and high strength fibers. Preferably, the fabric may include at least 1% by weight of high strength fibers, as above mentioned.

After the application of the composition of the invention on at least part of a fabric, preferably a denim, the fabric coated with the composition is dried in order to fix the coating to the fabric.

A further object of the invention is a process for producing a coated fabric, comprising the step of:
a) providing at least a fabric,
b) coating at least part of the fabric with an aqueous paste composition according to the invention, and
c) drying the fabric obtained in step b) to fix the coating to said fabric.

Independent process claim 13 makes reference to an aqueous paste composition according to any claims 1 to 12. Accordingly, independent process claim 13 is intended to refer to an aqueous paste composition having features according to any claims 1 to 12, and any combination thereof. In other words, the aqueous paste composition which step b) of claim 13 refers to may be any aqueous paste composition having features according to any claims 1 to 12, and any combination thereof.

According to the present invention, the coated fabric comprises a fabric and a coating.

As above mentioned, a suitable amount of paste composition may be applied to at least part of the fabric according to known methods, e.g., knife coating. According to embodiments, step c) comprises a step of heating the fabric obtained in step b). In this case, according to embodiments, the heating of the fabric provided with the aqueous paste composition of the invention may be carried out at a temperature ranging from 100° C. to 200° C., preferably from 130° C. to 180° C. For example, the step of heating may be continued for a time ranging from 1 to 5 minutes, preferably from 2 to 4 minutes.

According to embodiments, the heating the fabric provided with the composition may be carried out stepwise.

Accordingly, according to embodiments, step c) of the process of the invention comprises a step of heating the fabric obtained in step b) at a first temperature and a step of heating the fabric at a second temperature. Preferably, said second temperature is higher than said first temperature.

For example, the fabric obtained in step b) of the process of the invention, i.e., a fabric that is at least in part coated with the aqueous paste composition of the invention, may be heated to a first temperature to dry the composition. Subsequently, the fabric coated with the dry composition may be heated at a second temperature, preferably higher than said first temperature, to fix the coating to the fabric.

For example, the fabric provided with the composition may be heated at a first temperature ranging from 100° C. to 150° C., preferably from 120° C. to 140° C., for a time ranging from 0.5 to 5 min, preferably from 1 to 3 min. In this way, advantageously, the composition is dried on the fabric.

Subsequently, the fabric coated with the dry composition may be heated at a second temperature ranging from 150° C. to 200° C., preferably from 170° C. to 190° C., for a time ranging from 0.2 min to 2 min, preferably from 0.5 min to 1.5 min. In this way, advantageously, the dried composition is fixed to the fabric. According to embodiments, the process may further comprise a softening step d).

In particular, in softening step d) the coated fabric undergoes mechanical stress, so that the softness of the coated fabric increases. In this case, advantageously, the rigidity of the fabric is reduced.

Advantageously, it has been observed that, when the coated fabric undergoes mechanical stress, the rigidity of the fabric is reduced while impact abrasion resistance is maintained.

Methods to soften coated fabrics by applying one or more mechanical stresses are known in the art.

For example, a suitable softening method is ball washing. In this case, the coated fabric (or an article comprising it) is treated by washing, e.g., in a washing machine, in presence of hard elements (e.g., hard beads).

A further object of the invention is a coated fabric as obtainable through a process according to the invention, as above discussed.

According to an aspect, the coated fabric as obtainable through the process of the invention is a dry or substantially dry coated fabric.

In fact, advantageously, the step of drying the fabric provided with the composition of the invention, provides for the drying and fixing of the composition onto the fabric. In other words, the moisture (in particular, the water) in the composition is removed or substantially removed from the composition on the fabric during the drying step.

According to embodiments, the coating on the fabric is in the form of a matrix, e.g., a film.

For example, the coated fabric of the invention may comprise a dry or substantially dry polymeric film including a binder, a material having tensile modulus of at least 2000 MPa, and an antistatic agent.

For example, after drying, the binder in the composition of the invention may form a matrix in the form of a film which includes the material having tensile modulus of at least 2000 MPa, for example, PVDF, and the antistatic agent. The material having tensile modulus of at least 2000 MPa, and the antistatic agent in the dry coating on the fabric may be characterized according to known methods. For example, the high tensile modulus is formed of particles, the particles in the binder matrix may be identified with an optical microscope.

For example, the material having tensile modulus of at least 2000 MPa (preferably, PVDF), and the antistatic agent may be extracted from the coated fabric, isolated and separated according to known methods. After separation and isolation, the material having tensile modulus of at least 2000 MPa, and the antistatic agent may be characterized through known methods, such as, for example, spectroscopic and chromatographic techniques. For example, FTIR (Fourier Transform Infrared), Raman, GPC (Gel Permeation chromatography) and HPLC (High Performance Liquid chromatography) may be used for characterization of the components of the coating of the fabric.

Additionally, surface analysis may be carried out trough FT-IR in ATR (attenuated total reflectance) mode. The spectrum obtained from the not coated fabric may be subtracted from the spectrum obtained from the same fabric when coated, to obtain, as difference spectrum, the spectrum of the coating. In this way, advantageously, the components of the coating, in particular the material having tensile modulus of at least 2000 MPa (e.g., PVDF or glass fiber), may be identified.

As above mentioned, according to embodiments, after drying, the binder forms a matrix. In this case, such matrix can be degraded according to known methods, so that and small parts of it could be detected and characterized through known techniques.

For example, suitable solvents may be used to extract, for example, the material having tensile modulus of at least 2000 MPa (e.g., PVDF or glass fiber) from the coating, e.g., by dissolving the matrix formed by the binder. The extracted material may be analyzed through, for example, spectroscopic and/or chromatographic techniques to identify the material having tensile modulus of at least 2000 MPa used in the coating.

For example, qualitative analysis may be conducted in order to identify the material having tensile modulus of at least 2000 MPa (e.g., PVDF and/or glass fiber) in the dry coating on the textile substrate through one or more of the following methods which are, per se, known in the art:
Non-Destructive Methods (i.e., Disruption of the Dry Coating not Required)
   XRD (X-ray Diffraction), (Direct analysis)
   Solid-state NMR (Nuclear Magnetic resonance)
   FTIR (Fourier Transform Infrared Spectroscopy)
   Raman Spectroscopy
Destructive Methods (i.e., Disruption of the Dry Coating Required)
   NMR ($^{19}$F-NMR)
   Viscosity measurement (after extraction)
   XRD (X-ray Diffraction), (after extraction)
   Beilstein halogen test
   Raman Spectroscopy (after extraction)

According to embodiments, the material having tensile modulus of at least 2000 MPa, e.g., PVDF, glass fiber or mixtures thereof, may be present in the dry coating on the fabric as a powder, i.e. as particles; the particles preferably are micron particles e.g. with size in the range of 1 to 10 microns. The material may also be present a short fibers, e.g. fibers of a length short enough to avoid jeopardizing the final aspect of the fabric. A possible length of the fibers may be less than 5 mm, preferably less than 2 mm. In a final product in which the high tensile modulus is a thermoplastic material (e.g. PVDF) at least some of the particles of thermoplastic material may be in a coalesced for, or aggregated, form, possibly due to the heating and setting step. The area of aggregated particles may have different dimensions and may provide portions of a film.

The above mentioned techniques, suitable to characterize the dry coating on the fabric, are known in the art.

According to embodiments, the fabric is coated with the dry coating in an amount in the range of from 10 g to 40 g per square meter of fabric, preferably from 20 g to 30 g per square meter of fabric, more preferably from 22 g to 28 g per square meter of fabric.

According to embodiments, the coated fabric namely, the dry coating of the fabric, comprises from 24% to 38% by weight of a material having tensile modulus of at least 2000 MPa, from 48% to 75% by weight of a binder, and 5.5% to 8.5% by weight of an antistatic agent. Preferably, the dry coating of the fabric, comprises from 28% to 34% by weight of a material having tensile modulus of at least 2000 MPa, from 55% to 70% by weight of a binder, and 6% to 8% by weight of an antistatic agent. More preferably, the dry coating of the fabric, comprises from 30% to 32% by weight of a material having tensile modulus of at least 2000 MPa, from 60% to 65% by weight of a binder, and 6% to 8% by weight of an antistatic agent.

For example, the coating of the fabric may comprise about 31% by weight of PVDF, about 62% by weight of a binder and about 7% by weight of an antistatic agent.

In embodiments, advantageously, that coated fabric of the invention has an impact abrasion resistance that may be up to 8 s, wherein impact abrasion resistance being measured according to EN 13595-2.

In embodiments, advantageously, the coated fabric of the invention has an impact abrasion resistance of at least 3.5 s, preferably at least 4.5 s, more preferably at least 5.5 s, and even more preferably up to 8 s, wherein impact abrasion resistance being measured according to EN 13595-2.

According to embodiments, the coated fabric of the invention has an impact abrasion resistance that is at least 1.5 times, and up to 10 times the impact abrasion resistance of the fabric before the coating.

As above mentioned, the coated fabric of the present invention, i.e., a dry or substantially dry coated fabric according to the invention is suitable for the production of motorcycle gears, in particular motorcycle clothing articles, e.g., pants and jackets. Such motorcycle clothing articles, advantageously, have an appearance such that they may also be used in daily life.

As above mentioned, according to embodiments, the fabric may include one or more high strength performance yarns as well as one or more natural yarns and/or one or more synthetic yarns and/or one or more mixed yarns.

According to embodiments, the fabric includes at least 1% by weight, preferably at least 10%, more preferably at least 25% by weight, even more preferably at least 50% by weight of high strength performance yarns and/or fibers.

Still a further object of the invention is a garment comprising a coated fabric according to the invention.

According to an advantageous aspect of the present invention, the composition of the invention is applied to the side of the fabric which is the side of the fabric that is visible when a clothing article of garment comprising the coated fabric is worn.

In other words, the coating composition of the invention is advantageously applied on the side of a garment exposed to the outside environment.

According to embodiments, the dry coating on the fabric or garment is colourless or substantially colourless, so that the coating does not substantially affect the colour of the fabric or garment which is applied to. For example, if the fabric coated with the composition is an indigo dyed fabric, the coating would not affect the visual aestetical appearance of the indigo dyed fabric.

According to embodiments, the dry coating on the fabric may include a dye, to impart a color and/or visual aestetical effects to the fabric or garment which is applied to.

Advantageously, the fabric coated with the paste composition of the invention is provided with impact abrasion resistance, and it is also soft, stylish and low weight as well.

Another advantage of the present invention is that, through the process of the invention a coated fabric, and articles comprising it, having impact abrasion resistance properties can be manufactured in a fast, easy a cost efficient way.

EXPERIMENTAL SECTION

Example 1

Production of the Aqueous Paste Composition of the Invention

An exemplary embodiment of the composition of the invention may be produced as follows:

Mixing 50-200 parts by weight of water with 0.1-10 parts by weight of a wetting agent, to obtain an homogeneous mixture;

Adding 1-60 parts by weight of polyvinylidene fluoride (PDVF) to the mixture and mixing to obtain an homogeneous mixture;

Adding 16-60 parts by weight of a binder, 1-24 parts by weight of an antistatic agent and 0.1 to 4 parts by weight of an antifoam agent to the mixture and mixing to obtain an homogeneous mixture;

Adding a thickener in an amount suitable to obtain a composition having a suitable viscosity and mixing to obtain an homogeneous mixture.

Example 2

Production of a Coated Fabric According to the Invention

An exemplary embodiment of the coated fabric of the invention may be produced as follows:

Applying the aqueous paste composition produced in Example 1 to a woven fabric (e.g., a denim fabric) with in an amount ranging from 35 g to 100 g per square meter of fabric through knife coating;

Heating at 130° C. for 2 min to dry the composition;

Heating at 180° C. for 1 min to fix the coating to the fabric;

Washing the coated fabric in a washing machine in presence of hard elements (ball washing).

Example 3

Measurement of Impact Abrasion Resistance

A sample of a double warp woven fabric containing 73.15% by weight Kevlar® fibers and 26.85% by weight cotton fibers, having weight 538.33 g/m², and having warp density of 58.6 ends/cm and weft density of 17 ends/cm, was treated with the composition of the invention to obtain a coated (dry) fabric wherein the coating had the following composition: about 31% by weight of PVDF, about 62% by weight of binder (in the form of a polymeric matrix) and about 7% by weight of anti-static agent.

The impact abrasion resistance of the coated fabric was tested.

Another sample of the above mentioned fabric was not coated and its impact abrasion resistance was tested as control.

The testing of impact abrasion resistance was carried out according to EN 13595-2.

The control, not coated, fabric sample showed an impact abrasion resistance of 2.54 s, while the coated sample showed an impact abrasion resistance of 6.33 s.

In other words, the coated fabric sample showed an impact abrasion resistance which is about 2.5 times higher with respect to the not coated fabric sample.

The invention claimed is:

1. An aqueous paste composition for textile coating, comprising:
    1-60 parts by weight of at least one material having tensile modulus of at least 2000 MPa,
    1-24 parts by weight of at least one antistatic agent,
    16-60 parts by weight of at least one binder,
    50-200 parts by weight of water;
    wherein said composition is colourless, whereby, when applied to a coloured fabric, the coating does not substantially affect the colour of said fabric.

2. The composition according to claim 1, comprising particles and/or short fibers of said at least one material having tensile modulus of at least 2000 MPa.

3. The composition according to claim 1, containing 1-40 parts by weight of said at least one material having tensile modulus of at least 2000 MPa.

4. The composition according to claim 1, wherein said at least one material having tensile modulus of at least 2000 MPa is at least in part in powder form, selected from the group consisting of fluoropolymers, glass fiber and mixtures thereof.

5. The composition according to claim 1, wherein said at least one material having tensile modulus of at least 2000 MPa is a fluoropolymer, said tensile modulus being measured according to ISO 527-1 and ISO 527-2.

6. The composition according to claim 1, wherein said at least one material having tensile modulus of at least 2000 MPa is glass fiber, said tensile modulus being measured according to ASTM C1557-14.

7. The composition according to claim 1, containing 5-24 parts by weight of said at least one antistatic agent wherein said at least one antistatic agent is selected from the group consisting of esters of phosphoric acid, polyethylene glycol esters, polyols, quaternary ammonium compounds, polysiloxane, polyol amine, polyvinyl chloride derivatives, heterocyclic additives and mixtures thereof.

8. The composition according to claim 1, containing 16-50 parts by weight of said at least one binder, wherein said at least one binder is selected from the group consisting of vinyl acetate, acrylic, styrene/acrylic, vinyl/verstate, vinyl/acrylic copolymers and mixtures thereof.

9. The composition according to claim 1, further comprising at least one wetting agent, in an amount in the range of from 0.1 to 10 parts by weight wherein said wetting agent is selected from the group consisting of anionic, cationic, nonionic, amphoteric wetting agents, and mixtures thereof.

10. The composition according to claim 1, further comprising at least one antifoam agent, in an amount in the range of from 0.1 to 5 parts by weight.

11. A process for producing a coated fabric, comprising the step of:
    a) Providing at least a fabric,
    b) Coating at least part of said fabric with an aqueous paste composition according to claim 1,
    c) Drying the fabric obtained in step b) to fix said coating to said fabric;
    wherein the dry coating on said fabric is colourless, whereby said coating does not substantially affect the colour of the fabric.

12. The process according to claim 11, wherein said step c) comprises heating the fabric obtained in step b).

13. The process according to claim 11, wherein said step b) comprises applying said aqueous paste composition in an amount of at least 1 g per square meter of fabric.

14. The process according to claim 11, further comprising a softening step d) wherein the fabric obtained in step c) undergoes mechanical stress to reduce the rigidity of said fabric.

15. The process according to claim 14, wherein said mechanical stress is provided to said fabric by washing said fabric obtained in step c) in presence of hard elements.

16. A coated fabric comprising a fabric and a coating, as obtainable through a process according to claim 11, wherein said coating is an amount in the range of 10 g to 40 g per square meter of fabric, and wherein said coating is colourless, whereby said coating does not substantially affect the colour of the fabric.

17. The coated fabric according to claim 16, wherein said coating comprises: from 24% to 38 by weight of a material having tensile modulus of at least 2000 MPa, from 48% to 75%, by weight of a binder, and from 5.5% to 8.5% by weight of an antistatic agent.

18. The coated fabric according to claim 16, wherein said fabric includes at least 1% by weight of high strength performance yarns and/or fibers, wherein the material for said high strength performance yarns and/or fibers is selected from the group consisting of, Aramid, Ultra High Molecular Weight Polyethylene, polybenzoxazole, polyarylate, carbon, polyolefin, and mixture thereof.

19. The coated fabric according to claim 16, wherein said coated fabric has an impact abrasion resistance of at least 3.5 s, said impact abrasion resistance being measured according to EN 13595-2.

20. The composition according to claim 5, wherein said at least one material having tensile modulus of at least 2000 MPa is polyvinylidene fluoride (PVDF), said tensile modulus being measured according to ISO 527-1 and ISO 527-2.

21. The process according to claim 11, wherein said step c) comprises heating the fabric obtained in step b) at a first temperature and then at a second temperature, wherein said second temperature is higher than said first temperature.

22. The composition according to claim 1, containing 20-40 parts by weight of said at least one material having tensile modulus of at least 2000 MPa.

* * * * *